(12) United States Patent
Hofferberth

(10) Patent No.: US 8,070,184 B2
(45) Date of Patent: Dec. 6, 2011

(54) SUPPLEMENTAL AUTOMOTIVE RESTRAINT FOR PREGNANT WOMEN

(75) Inventor: James Edward Hofferberth, Reynoldsburg, OH (US)

(73) Assignee: James Research & Development Ltd., Reynoldsburg, OH (US)

( * ) Notice: Subject to any disclaimer, the term of this patent is extended or adjusted under 35 U.S.C. 154(b) by 0 days.

(21) Appl. No.: 13/156,587

(22) Filed: Jun. 9, 2011

(65) Prior Publication Data

US 2011/0233911 A1 Sep. 29, 2011

Related U.S. Application Data

(62) Division of application No. 12/564,064, filed on Sep. 22, 2009.

(60) Provisional application No. 61/223,154, filed on Jul. 6, 2009.

(51) Int. Cl.
*B60R 22/28* (2006.01)
*B60R 22/14* (2006.01)

(52) U.S. Cl. ............ 280/751; 297/467; 297/488; 2/464; 2/463; 2/466

(58) Field of Classification Search .......... 280/751, 280/801.1, 805, 733, 290, 808; 297/467, 297/488, 487, 465, 470, 471, 482, 468, 483, 297/484, 486; D29/101.3, 101.4, 101.5; 244/122 AG; 2/455, 464, 463, 466
See application file for complete search history.

(56) References Cited

U.S. PATENT DOCUMENTS

| | | | | |
|---|---|---|---|---|
| 3,905,615 A | * | 9/1975 | Schulman | 280/730.1 |
| 3,936,075 A | * | 2/1976 | Jelliffe | 280/751 |
| 3,941,404 A | * | 3/1976 | Otaegui-Ugarte | 280/733 |
| 3,948,541 A | * | 4/1976 | Schulman | 280/733 |
| 3,968,994 A | * | 7/1976 | Chika | 297/486 |
| 4,063,778 A | * | 12/1977 | Chika | 297/465 |
| 4,502,732 A | * | 3/1985 | Williams | 297/488 |
| 4,610,463 A | | 9/1986 | Efrom | |
| 4,638,510 A | * | 1/1987 | Hubbard | 2/6.1 |
| 4,886,318 A | * | 12/1989 | Pennock | 297/482 |
| 4,984,849 A | * | 1/1991 | Rist | 297/482 |
| 5,005,865 A | | 4/1991 | Kruse | |
| 5,156,436 A | | 10/1992 | Grene | |
| 5,213,366 A | * | 5/1993 | Sweger, Jr. | 280/808 |

(Continued)

FOREIGN PATENT DOCUMENTS

GB 2402653 A * 12/2004
JP 2005145391 A * 6/2005

*Primary Examiner* — Paul N Dickson
*Assistant Examiner* — Keith Frisby
(74) *Attorney, Agent, or Firm* — Frank H. Foster; Kremblas & Foster

(57) ABSTRACT

A Supplemental Automotive Restraint System for Pregnant Women has a protective shell structure with integral "Pelvic Yoke and Crotch Post", "Breast Plate", structural "Abdominal Bridge/Shell" over the abdomen between the "Pelvic Yoke" and the "Breast Plate", "Shoulder Belt Retainer", and appropriate padding and fill material, all of which work in conjunction with the standard automotive Type II lap and shoulder belt restraint system as required to be installed in all new passenger cars manufactured for sale in the United States by Federal Motor Vehicle Safety Standard No. 208 (FMVSS 208). The purpose of the "Supplemental Automotive Restraint System for Pregnant Women" is to reduce the likelihood of injury to a pregnant mother and her unborn child during maneuvering, crash, or other non-impact event of a motor vehicle while the mother is driving or riding in the vehicle.

6 Claims, 4 Drawing Sheets

U.S. PATENT DOCUMENTS

| | | | | |
|---|---|---|---|---|
| 5,272,770 | A | * | 12/1993 | Allen et al. ......................... 2/421 |
| D349,589 | S | * | 8/1994 | York .......................... D29/101.3 |
| 5,562,326 | A | * | 10/1996 | Stroud ........................... 297/465 |
| 5,795,030 | A | * | 8/1998 | Becker ........................... 297/488 |
| 6,174,032 | B1 | * | 1/2001 | Conaway ....................... 297/487 |
| 6,302,490 | B1 | * | 10/2001 | Hanna et al. ................... 297/487 |
| 6,591,430 | B1 | * | 7/2003 | Sledge .............................. 2/468 |
| 2003/0052528 | A1 | | 3/2003 | Huggins |

* cited by examiner

SUPPLEMENTAL AUTOMOTIVE RESTRAINT FOR PREGNANT WOMEN

CROSS-REFERENCES TO RELATED APPLICATIONS

This application is a division of U.S. application Ser. No. 12/564,064 filed Sep. 22, 2009 which claims the benefit of U.S. Provisional Application No. 61/223,154, filed Jul. 6, 2009.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

When a motor vehicle is involved in an accident, the standard automotive lap and shoulder belt restraint system, if properly used, provides a minimum level of protection from crash injury to the passengers or driver as required by Federal Motor Vehicle Safety Standard number 208—Occupant Crash Protection. This minimum level of protection is currently required for adult passengers and drivers who are either a 5th percentile adult female or a 50th percentile adult male. For persons who are smaller than a 5th percentile adult female, supplemental restraint devices are required to provide a minimum level of protection pursuant to Federal Motor Vehicle Safety Standard 213. There are currently no motor vehicle safety standards relating to adults larger than a 50th percentile male adult, or to a pregnant woman of any size and her unborn child(ren).

The purpose of the "Method For Supplemental Automotive Restraint For Pregnant Women" (Method/Device) is to provide enhanced protection for the pregnant mother and her unborn child(ren).

There are several categories of injuries that occur to lap and shoulder belted occupants in motor vehicle crashes. One category results from violent contact with the steering wheel, the inner door surfaces and related components, the dashboard area and related components, the windshield, side windows and their related frames, and other objects. A second category involves injuries caused by inflating air bags, and a third category involves injuries caused by the lap and shoulder belts. These belt-induced injuries are commonly referred as "Seat Belt Syndrome". "Seat Belt Syndrome" injuries are signified by skin abrasions of the neck, chest, and abdomen, which indicate internal injury in approximately 30% of cases. Neck abrasions are associated with injuries to the carotid artery, larynx, and cervical spine. Chest abrasions are associated with fractures of the sternum, ribs, and clavicles, and injuries to the lungs, heart and thoracic aorta. Abdominal abrasions are associated with mesenteric tears, bowel perforation and hematoma, injuries to the abdominal aorta and injuries to the spine, spinal cord, and pelvis.[i] These injuries are exacerbated when the lap belt slips up over the pelvis and into the lower abdominal cavity. This is commonly referred to as "submarining", and it is the natural tendency and a frequent occurrence in motor vehicle crashes and at other times.[i] Hayes, Conway, Walsh, Coppage, & Gervin, "Seat Belt Injuries: Radiologic and Clinical Correlation", Department of Radiology, Medical College of Virginia, Radiographics, January 1991, 11(1):23-36

There are two categories of forces between the seat belts and the body of the person. The first involves the static forces that are intended to hold the belts in place during normal vehicle operations. These static forces are typically provided by a seat belt retractor or similar device. These forces are minimal in the absence of a crash or other abrupt motion change (acceleration) of the vehicle, and are associated primarily with the comfort of the passenger. They are inconsequential in causing injury to the passenger provided that they maintain the belts in the proper position prior to the crash.

The second category of force between the seat belts and the body of the person involves the dynamic forces between the surface of the body and the lap and shoulder belts as required to restrain the body in the vehicle during the abrupt motions of crash or other event. These forces exist only when the vehicle is undergoing a crash or other abrupt motion change (acceleration).

Seat Belt Syndrome injuries result from this second category of dynamic forces. These forces are applied to the limited area of direct contact between the belts and the surface of the body. The application of these high dynamic forces to the limited area of contact between the belts and the person's body causes high stresses and strains in various parts of the body, which are the root causes of Seat Belt Syndrome injuries.

The mechanisms of injury to the fetus are less well documented, but the risk of injury is clearly extended to the unborn child. Of pregnant women who are treated for injury in hospital emergency departments, "Motor Vehicle occupant injuries were the leading mechanism of emergency department injury-related visits . . . . Pregnant women with an injury-related emergency department visit were more likely than non-injured pregnant women to experience pre-term labor, placental abruption, and cesarean delivery.[ii] [ii] Weiss, Sauber-Schatz and Cook, "The Epidemiology of Pregnancy-Associated Emergency Department Injury Visits and their Impact on Birth Outcomes", Accident Analysis and Prevention, Volume 40, Issue 3, May, 2008, pp. 1088-1095.

The unborn child is at risk because the mother's abdomen provides limited protection against objects that impinge on the abdomen, such as the steering wheel, lap and shoulder belts, air bag restraints, door handles and other objects and surfaces within the vehicle that are likely to contact and apply force to the mother's body in both accident and non-accident situations. In particular, the lap and shoulder belts, steering wheel and air bags are designed to protect the mother. They also provide some protection to the fetus, but in addition, all three pose additional side effect risks of injury to the fetus.

BRIEF SUMMARY OF THE INVENTION

The purpose of the "Method/Device" is to reduce the likelihood of injury to a pregnant mother and her unborn child(ren) during maneuvering, crash, or other non-impact event of a motor vehicle while the mother is driving or riding in the vehicle by preventing direct contact between the lap and shoulder belts, air bags, steering wheel and other objects with the abdomen; directing lap belt forces away from the abdomen and into the pelvis and ribs to the extent feasible; directing shoulder belt forces away from the abdomen and into the pelvis and ribs to the extent feasible; and applying the forces required to restrain the abdomen through an appropriately contoured and padded interior surface of the "Abdominal Bridge/Shell" protective structure.

Figure 1:
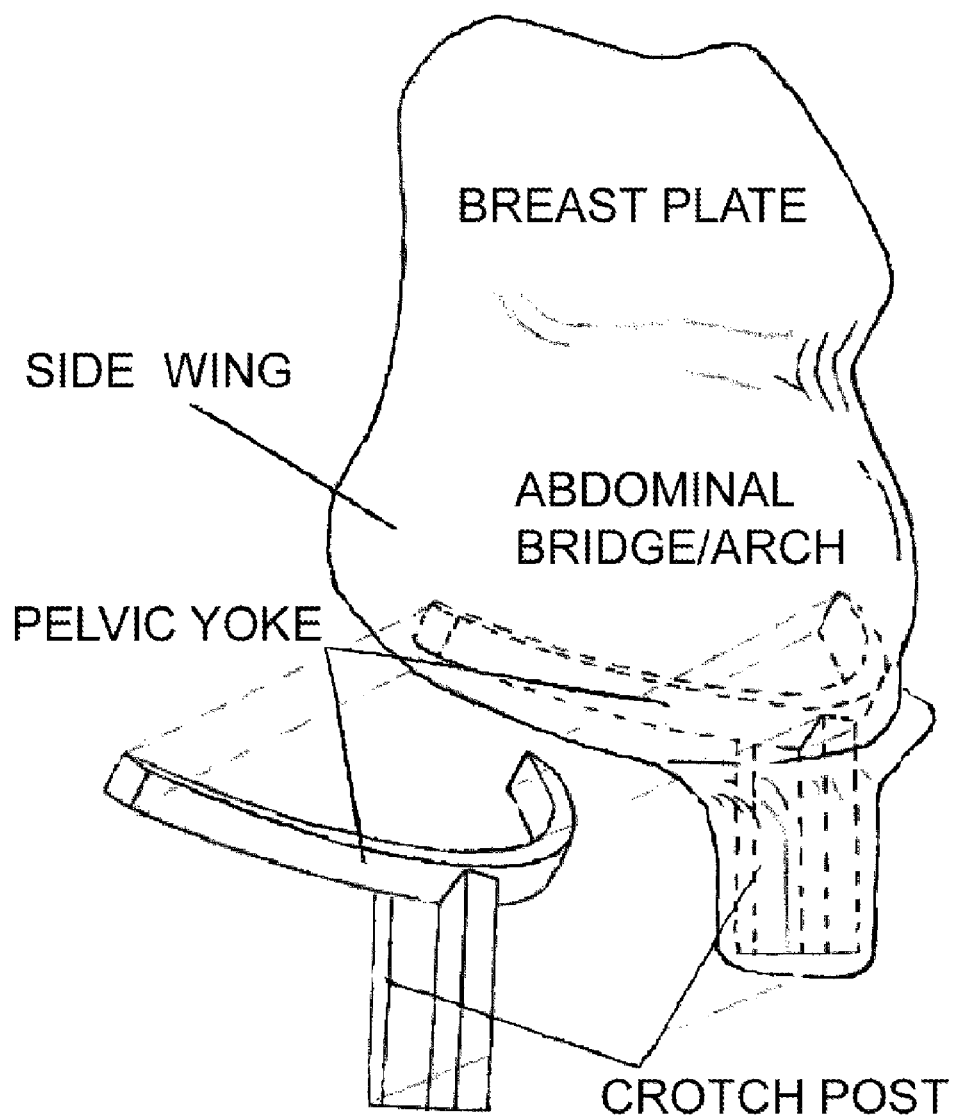
FIG. 1 illustrates the general shape and arrangement of the several integral parts of the Method/Device, including the "Abdominal Bridge/Shell", "Breast Plate", "Pelvic Yoke" and "Crotch Post", "Side Wings", and "Shoulder Belt Retainer".
Figure 2:
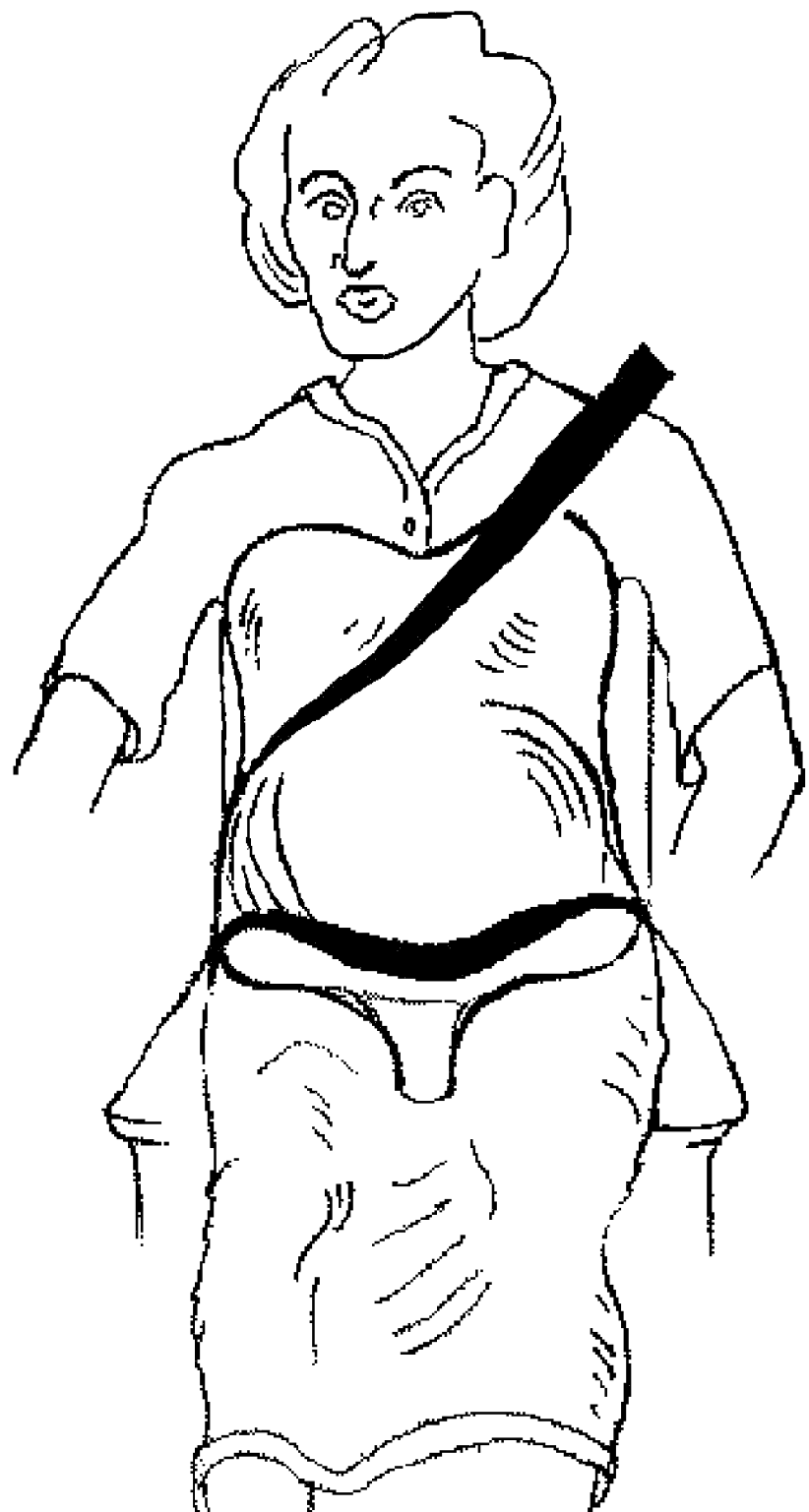
FIG. 2 illustrates a frontal view of the proper use of the Method/Device with the conventional lap and shoulder belts that are required to be installed in the vehicle by Federal Motor Vehicle Safety Standard No. 208, Occupant Crash Protection.
Figure 3:
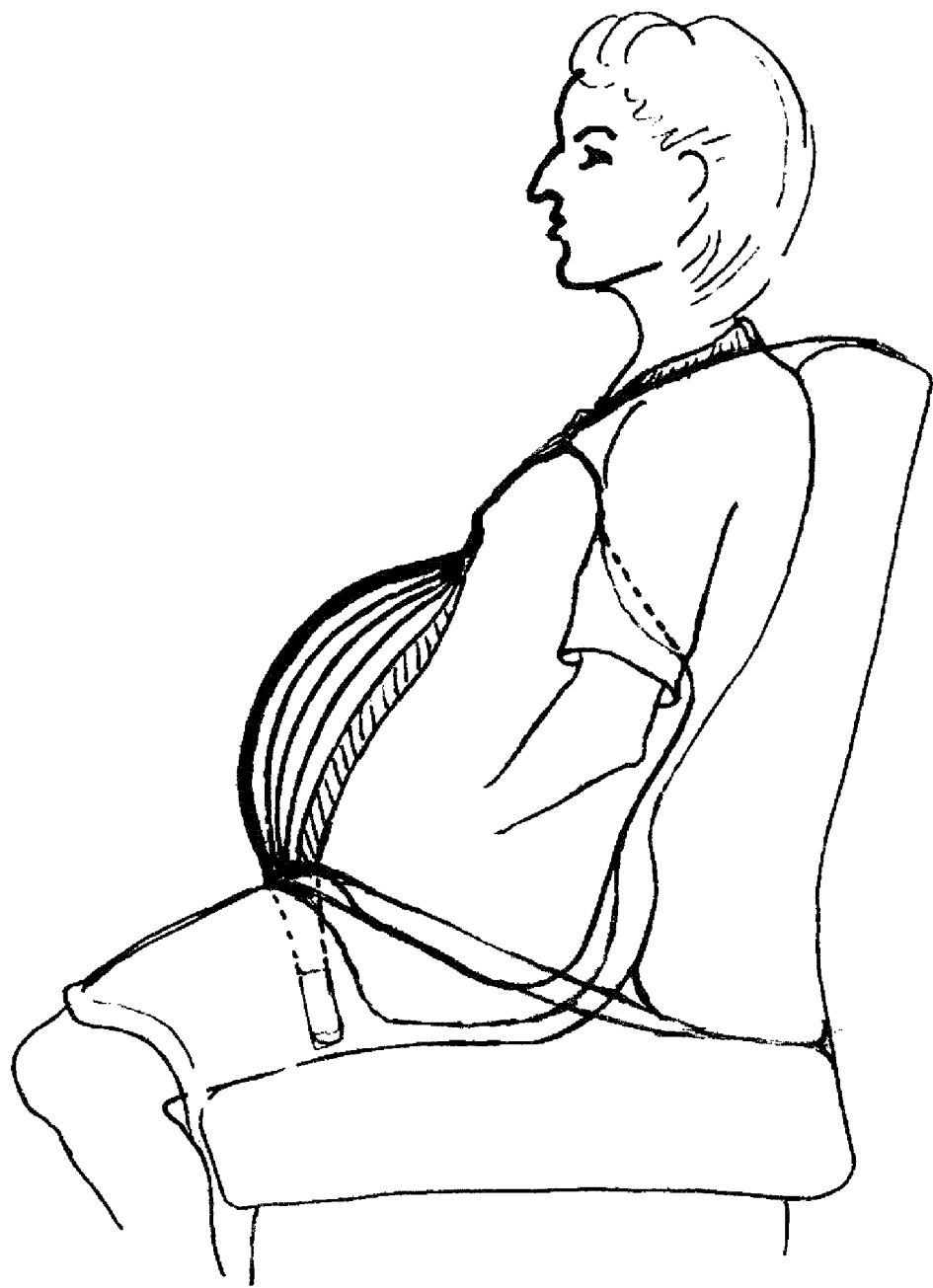
FIG. 3 illustrates a side view of the proper use of the Method/Device with the conventional lap and shoulder belts that are required to be installed in the vehicle by Federal Motor Vehicle Safety Standard No. 208, Occupant Crash Protection, including a representation of the internal spacing/padding elements used to accommodate the changing anthropometry of the pregnant woman during her pregnancy.
Figure 4:
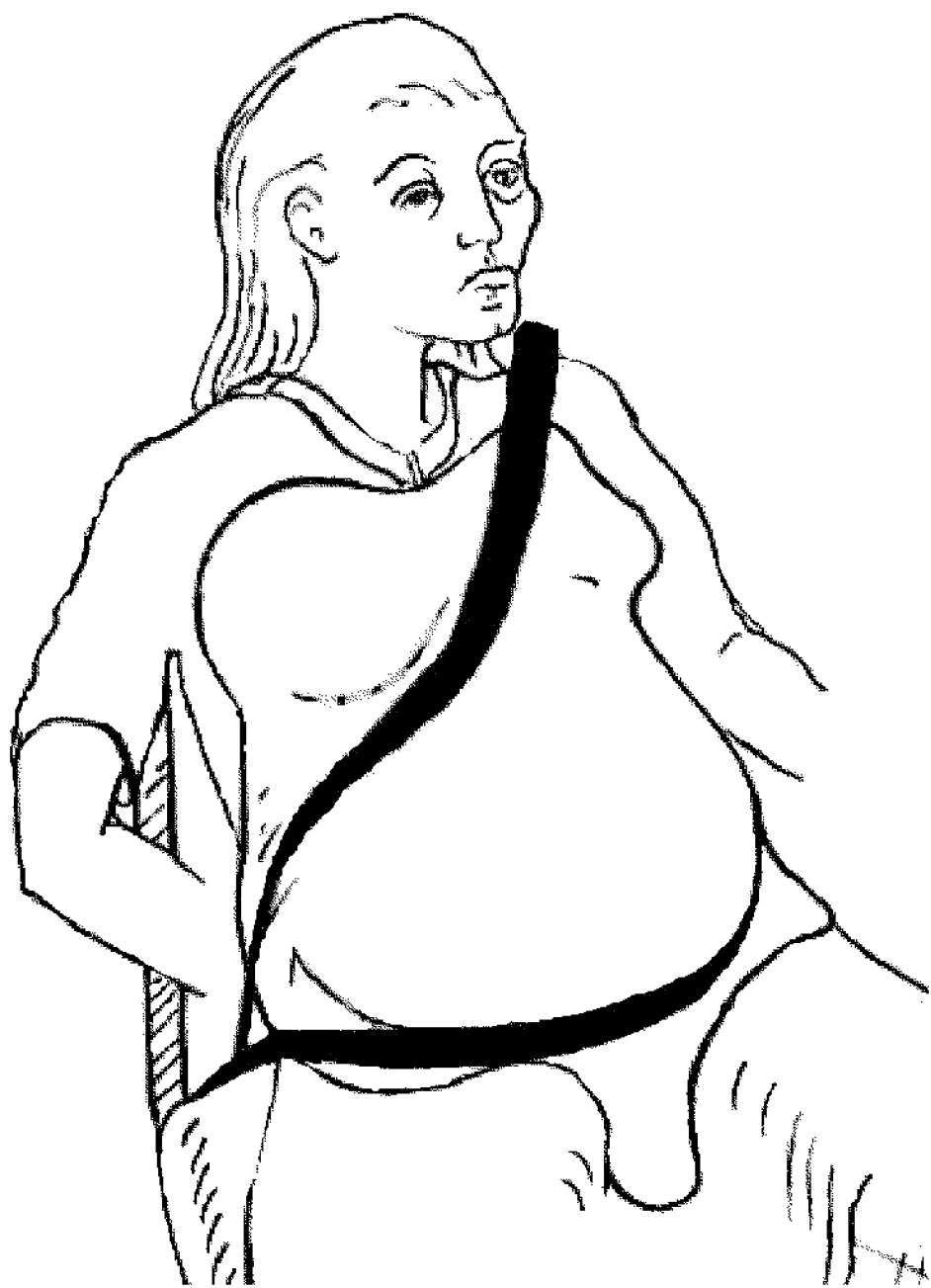
FIG. 4 illustrates a side-frontal view of the proper use of the Method/Device with the conventional lap and shoulder belts that are required to be installed in the vehicle by Federal Motor Vehicle Safety Standard No. 208, Occupant Crash Protection.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Patent application Ser. No. 12/564,064 filed Sep. 22, 2009, Publication number US 2011/0001311 A1, the above claimed priority application, and U.S. Provisional Application No. 61/223,154, filed Jul. 6, 2009 are hereby incorporated in this application by reference.

The "Method/Device" provides an enhanced level of protection to both the mother and her unborn child(ren) as follows:

1. Lap Belt Forces. The lap belt is intended to be positioned low on the torso such that lap belt forces are directed primarily into the area of the pelvic iliac crests. There is a common and natural tendency, both during crash events and at other times, for the lap belt to move above the area of the iliac crests to a position that allows penetration of the lower abdomen and application of lap belt forces directly to the abdomen. The "Method/Device" provides a geometric configuration and structure to help prevent the "Method/Device" from moving upward on the woman's body, maintain the lap belt below the abdomen, direct lap belt forces downward and aft to the mother's pelvic iliac crests and pubic bony structures through the "Pelvic Yoke" and integral "Crotch Post", and direct the upper and rotational components of these forces to the "Abdominal Bridge/Shell" for transmission over the abdomen to the "Breast Plate".

2. Shoulder Belt Forces. The shoulder belt is intended to be positioned above the abdomen and below the neck to avoid direct application of shoulder belt forces to the upper abdomen and neck. There is a common and natural tendency, both during crash events and at other times, for the shoulder belt to move both downward into the upper abdomen and/or upward into the area of the neck. The "Method/Device" provides a geometric configuration and structure to help maintain the shoulder belt above the abdomen and below the neck ("Shoulder Belt Retainer"), direct shoulder belt forces to the mother's sternum and ribs through the contoured padded "Breast Plate" designed to provide a relatively even distribution of shoulder belt forces over the surface of the torso, and direct the lower and rotational components of these forces to the "Abdominal Bridge/Shell" for transmission over the abdomen to the "Pelvic Yoke".

3. Submarining. When the lap belt applies the aft directed crash forces to the iliac crests, which is the intended function of the lap belt, it naturally causes, in combination with the forward directed, inertial forces caused by the restraint of the legs, a top-aft rotational torque acting on the pelvis that tends to induce submarining of the pelvis under the lap belt with resulting injury to the abdomen, spine and other body areas. The "Method/Device" provides a load path directly to the pubis by means of the "Crotch Post" to react the top-aft rotational torque on the pelvis to help prevent submarining of the pelvis under the lap belt, and direct the upper and rotational components of these forces to the "Abdominal Bridge/Shell" for transmission over the abdomen to the "Breast Plate".

4. Protective "Abdominal Bridge/Shell". It is common in both crash and non-crash situations for the lap and shoulder belts, air bags, steering wheel, side panels and related components, dashboard and related components, and other objects to contact, penetrate and/or distort the abdomen. The "Method/Device" provides a protective "Abdominal Bridge/Shell" structure over the abdomen to protect the abdomen from contact, penetration and/or distortion by objects such as the lap and shoulder belts, air bags, steering wheel, side panels and related components, dashboard and related components, and other objects, and to bridge the lap & shoulder belt crash forces over the abdomen and to either the "Pelvic Yoke" or the "Breast Plate".

5. "Abdominal Bridge/Shell" Catchment. There is a natural tendency for the abdomen to move forward in a frontal crash and attempt to extrude itself between the lap and shoulder belts. This causes extreme distortion and high potential for injury to the abdominal organs, spine and ribs. The "Method/Device" provides an appropriately contoured and padded catchment chamber integral to the "Abdominal Bridge/Shell" to catch and restrain the abdomen in a contoured protective shell that provides a relatively even application of the forces required to restrain the abdomen and reduce shape deformation of the abdominal organs, spine, and ribs during the event.

6. "Side Wings". There is a natural tendency for the door or other vehicle side structure to impact the side of the body particularly during side and/or rollover crashes. The "Method/Device" provides protective "Side Wing" structures to provide enhanced protection for the pelvis, abdomen and lower ribs in side impact and rollover crashes and other incidents.

7. "Filler/Padding Elements". The shape of the woman's body progressively changes during the pregnancy. The "Method/Device" provides appropriate internal "Filler/Padding Elements" to accommodate the changing anthropometry of the woman's body during pregnancy and prevent excessive distortion of the spine, abdomen and uterus.

8. Internal Padding. The "Method/Device" provides a relatively even distribution of all residual crash forces to the surface of the mother's body through the contoured and padded inner surfaces of the "Method/Device".

PRIOR ART

There is a wealth of prior art relating to safety belts in various types of vehicles, including Federal Motor Vehicle Safety Standard Numbers 208, 209, and 213. This "Method/ Device" augments and enhances the protective capabilities of these devices.

In the patent literature, several devices are disclosed relative to belt-type restraint systems for motor vehicles, including several (such as References 5 and 6) that utilize a crotch strap to prevent the pelvis from submarining under the lap belt, which is its natural and highly injury producing tendency during crashes. Such crotch straps are highly effective in preventing submarining of the pelvis under the lap belt, and they are in common usage in military applications, competitive racing vehicles, and child and infant restraint systems. They are not in common usage by adults in passenger vehicles, and the level of performance they provide is not required under the applicable Federal Motor Vehicle Safety Standard #208 because the public has shown great resistance to the usage of such devices, and it is judged that the effect of crotch strap installation would be an undesirable reduction in seat belt usage rates. The "Method/Device" provides protection from pelvic submarining under the lap belt without a crotch strap by use of a "Crotch Post" which prevents pelvic submarining and provides a direct load path for the application of lap belt crash forces to the pubis portion of the pelvis. It functions as an integral part of the "Pelvic Yoke" which provides a second direct load path for the application of lap belt crash forces to the pelvis through the iliac crests. The integral "Pelvic Yoke" and "Crotch Post" direct the rearward upper components of these forces into the "Abdominal Bridge/Shell", which carries them over the abdomen and reacts them against the bony ribs through the "Breast Plate".

There are also several patents, such as References 3 and 4, which deal with cushion or pillow like interventions of various types. These devices provide little or no protection against pelvic submarining and extreme distortion of the abdomen and spine. In addition they would provide very limited protection of the abdomen in crash impact situations because in the absence of a semi-rigid shell or other protective structure, the belts will simply knife through the pillows and produce the same types of injuries seen with conventional lap and shoulder belts. The lower steering wheel would behave in the same way.

Perhaps the closest prior art is illustrated in References 1 and 2, wherein a structural shell is positioned over the abdomen, and the lap belt forces are directed into the shell. In this configuration, virtually all lap belt forces would be transmitted directly into and through the abdomen in the area of the uterus/fetus. Furthermore, the high location of the lap belt would increase the tendency of the pelvis to rotate and submarine under the lap belt resulting in increased injury potential for both the mother and her unborn child(ren), This is opposite of the design intent and operation of the "Method/ Device", which directs these forces away from the abdomen and uterus, and into the bony pelvis structure, and directs the upper rearward components of these forces to the "Abdominal Bridge/Shell" for transmission over the abdomen to the "Breast Plate".

The "Method/Device" directs virtually all of the lap belt forces required to restrain the hips and legs into the pelvis, and the upper components of these forces are bridged over the abdomen into the "Breast Plate" where they are reacted into the lower rib structures through the padded contoured surface of the "Breast Plate". The forces required to restrain the upper thorax, neck, head and arms are directed primarily through the "Breast Plate" into the ribs. In the area above the "Breast Plate", some of these forces are applied by the shoulder belt directly to the area of the upper ribs, clavicles, and neck, which is the normal and intended function of the shoulder belt. The primary force directed into the abdomen is the force required to restrain the abdomen itself, and there is no way to divert these forces away from the abdomen since they are required to react the body forces of the inertial mass of the abdomen itself.

PREFERRED EMBODIMENT

In the preferred embodiment, the "Method/Device" is constructed primarily of inner and outer layers of fiber reinforced plastic to achieve the required strength and flexibility to provide a high level of supplemental protection to the mother and child in a crash. The "Pelvic Yoke" and "Crotch Post" will be composed of dense plastic foam or other material to reinforce and maintain spacing between the inner and outer layers of the "Abdominal Bridge/Shell" to add the structural rigidity required to carry the high bending loads that will occur in this area during a crash. "Filler/Padding Elements" materials consist of a variety of plastic foams, including semi rigid foams for the fill components, firm and highly damped flexible foams for the energy absorbing layers, and medium to light firmness foam for inner comfort and spacing layers.

Many materials could be used for this application, but care must be exercised to assure sufficient strength, flexibility and energy absorption characteristics to provide a high level of supplemental protection to the mother and child in a crash.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A supplemental automotive restraint for use with a shoulder and lap belt and engaging the front of a pregnant woman, the restraint comprising:
   (a) an integrally formed pelvic yoke and crotch post,
      (i) the crotch post, in an operable position, engaging the pelvic bone of the pregnant woman at her pubis and providing a load path directly to her pubis,
      (ii) the pelvic yoke, in an operable position, extending laterally across the abdomen of the pregnant woman between her left and right iliac crests and providing a load path directly to each of her iliac crests; and
   (b) a protective shell integrally connected to the integrally formed pelvic yoke and crotch post and contoured for the anthropometry of a pregnant woman and integrally comprising a breast plate and an abdominal bridge/shell,
      (i) the integral breast plate having interior padding and contoured to engage and uniformly distribute shoulder belt forces against the chest of the pregnant woman, including the sternum and ribs,
      (ii) the integral abdominal bridge/shell formed as a bridging arch structure, in an operable position extending over the abdomen between the pelvic yoke and the breast plate, the abdominal bridge/shell having interior padding and contoured to engage and uniformly distribute lap and shoulder belt forces against the abdomen of the pregnant woman and to transmit the forces required to catch and restrain her abdomen away from the abdomen to the lap and shoulder belts; and (c) a shoulder belt retainer formed on the exterior of the protective shell.

2. A supplemental automotive restraint in accordance with claim 1 wherein the protective shell is constructed of layers of fiber reinforced plastic.

3. A supplemental automotive restraint in accordance with claim 2 wherein the protective shell further comprises pelvic side wings.

4. A supplemental automotive restraint in accordance with claim 3 wherein the padding is firm, highly damped energy absorbing material on the interior of the entire abdominal protective shell.

5. A supplemental automotive restraint in accordance with claim 1 wherein the protective shell further comprises pelvic side wings.

6. A supplemental automotive restraint in accordance with claim 1 wherein the padding is firm, highly damped energy absorbing material on the interior of the entire abdominal protective shell.

* * * * *